Figure 1:
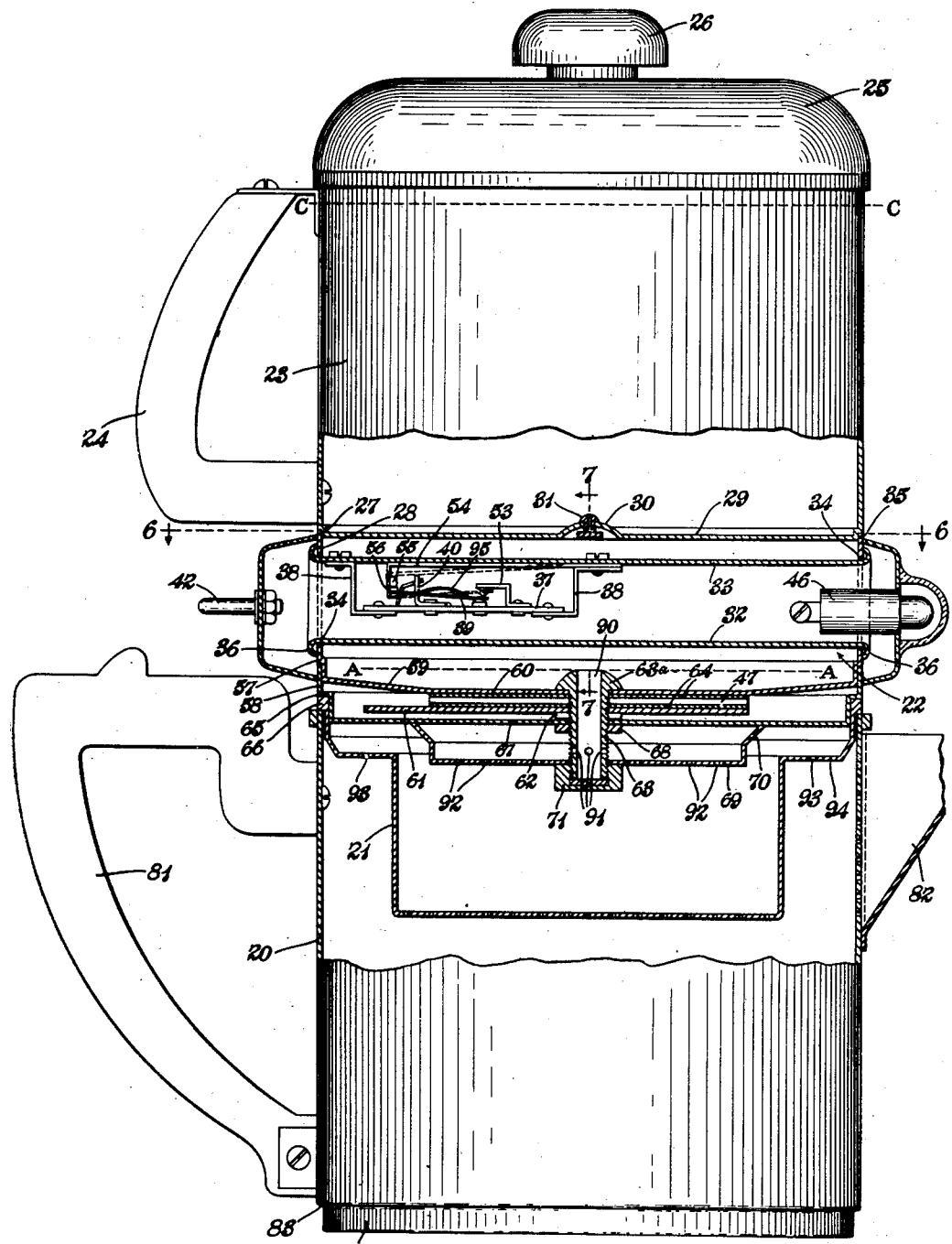

June 16, 1953 — A. C. WILCOX — 2,641,991
AUTOMATIC WATER CONTROLLED ELECTRIC DRIP COFFEE MAKER
Filed Dec. 2, 1949 — 5 Sheets-Sheet 1

INVENTOR
Albert C. Wilcox
BY Frease and Bishop
ATTORNEYS

June 16, 1953           A. C. WILCOX           2,641,991

AUTOMATIC WATER CONTROLLED ELECTRIC DRIP COFFEE MAKER

Filed Dec. 2, 1949           5 Sheets-Sheet 2

INVENTOR.
Albert C. Wilcox
BY
ATTORNEYS

June 16, 1953  A. C. WILCOX  2,641,991
AUTOMATIC WATER CONTROLLED ELECTRIC DRIP COFFEE MAKER
Filed Dec. 2, 1949  5 Sheets-Sheet 3

INVENTOR.
Albert C. Wilcox
BY
ATTORNEYS

INVENTOR.
Albert C. Wilcox
BY
Frease and Bishop
ATTORNEYS

June 16, 1953  A. C. WILCOX  2,641,991
AUTOMATIC WATER CONTROLLED ELECTRIC DRIP COFFEE MAKER
Filed Dec. 2, 1949  5 Sheets-Sheet 5

INVENTOR.
Albert C. Wilcox
BY
*Fraser & Bishop*
ATTORNEYS

Patented June 16, 1953

2,641,991

UNITED STATES PATENT OFFICE 2,641,991

AUTOMATIC WATER-CONTROLLED ELECTRIC DRIP COFFEE MAKER

Albert C. Wilcox, Chicago, Ill.

Application December 2, 1949, Serial No. 130,676

5 Claims. (Cl. 99—281)

The invention relates to drip coffee makers and more particularly to a water-controlled full automatic electric drip coffee maker.

Under present practice, electric drip coffee makers are so constructed that the heating means is located between the upper, or cold water, container and the coffee basket so that the water after being heated is passed down through the ground coffee in the basket. With such constructions it has not been possible to maintain the brewed coffee beverage, in the lower container, hot, as is customary in the conventional automatic vacuum coffee makers. The present invention contemplates a construction wherein the heating means which brews the coffee is in turn used to maintain the brewed coffee at desired temperature.

It is an object of the invention to simplify the automatic features of such drip coffee makers so that the manufacturing cost may be relatively low in order that they may be sold to the trade at a low price.

Another object is to provide a drip coffee maker of the type referred to of such construction that it will operate automatically without requiring any attention from the housewife or other operator after it has been prepared for operation.

A further object is to provide such a drip coffee maker which is water-controlled rather than by heat radiated directly from the heating unit.

A still further object is to provide a drip coffee maker of this character in which the heating unit is housed in a compartment separate from the bi-metal element which controls the switch, so that the bi-metal is protected from the direct heat of the heating unit.

Another object is to provide a drip coffee maker of this type in which the bi-metal is submitted to the flow of cold water from the upper water container and is not operative as long as cold water continues to flow therefrom.

A further object of the invention is to provide a drip coffee maker of this type with a novel heating unit which may be removed entirely from the coffee maker unit and utilized as a heating means to maintain the brewed coffee at desired temperature.

A still further object is to provide a drip coffee maker having such a heating unit adapted to be operated in the manner hereinafter described without injury to the heating unit or the mechanical construction, after being deprived of the flow of cold water from the upper container, which controls the brewing process.

Another object is to provide a drip coffee maker of the character referred to which may be made in large sizes for brewing 6 or 8 cups of coffee, and which is so constructed that it will brew small amounts of coffee such as one or two cups, of proper strength and temperature.

A further object is to so construct the heating unit that a low degree bi-metal element may be used for controlling the drip operation, thus insuring sensitive cut-off of the electric heating unit, and at the same time being so located and constructed that the heating unit will remain on during the process of flowing the entire amount of cold water out of the upper water container.

Figure 4:
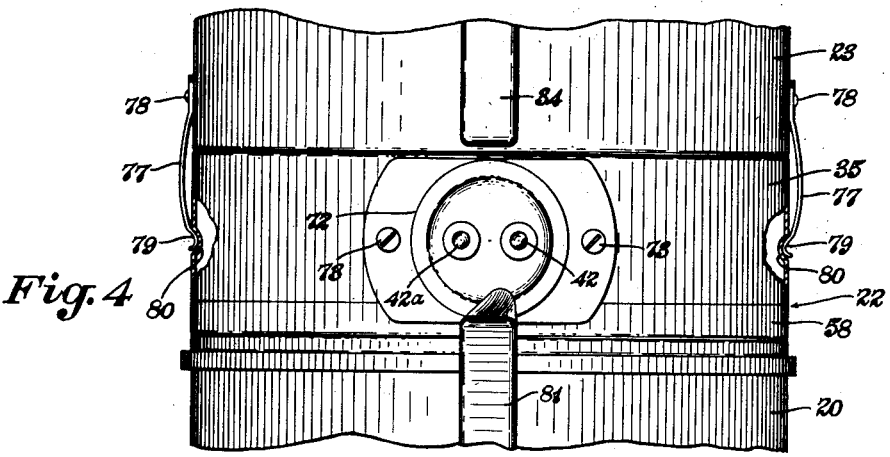
Figure 5:
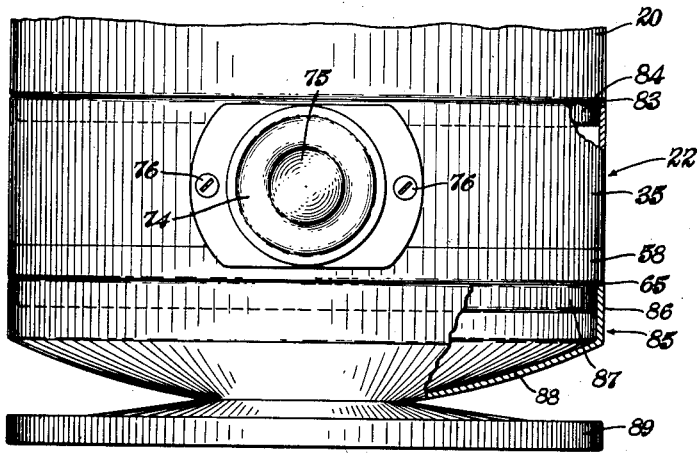
Figure 2:
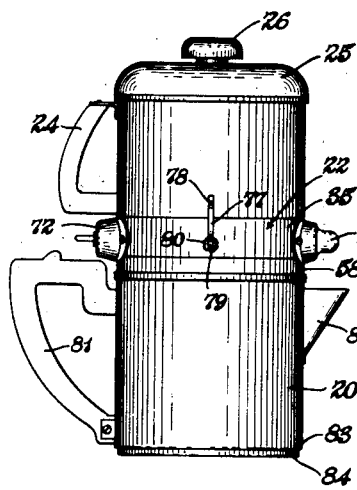
Figure 3:
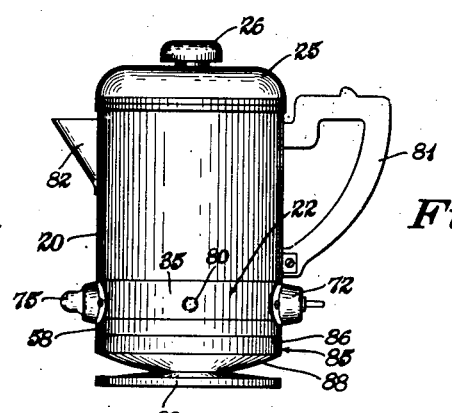
Figure 6:
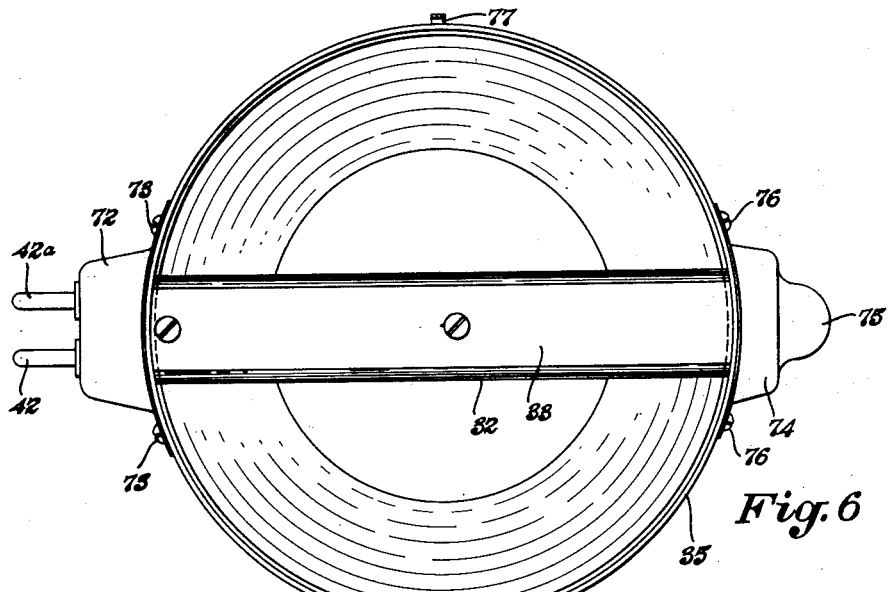
Figure 7:
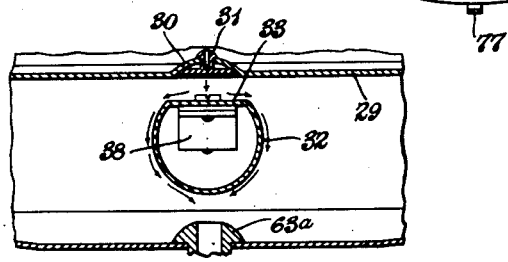
Figure 8:
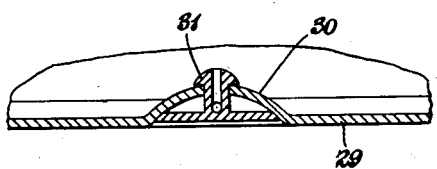
Figure 12:
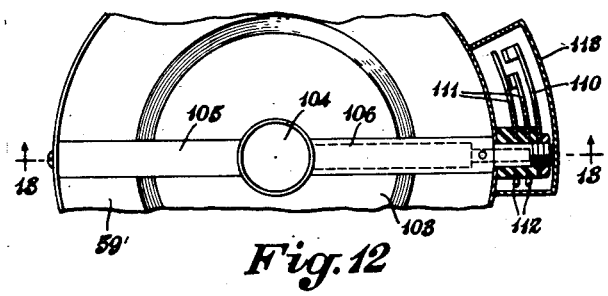
Figure 13:
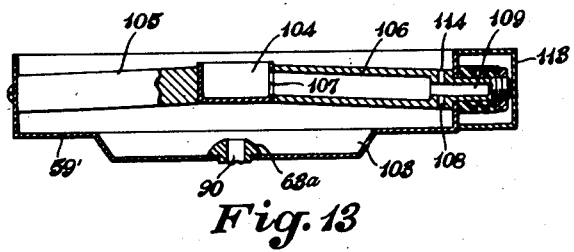
Figure 9:
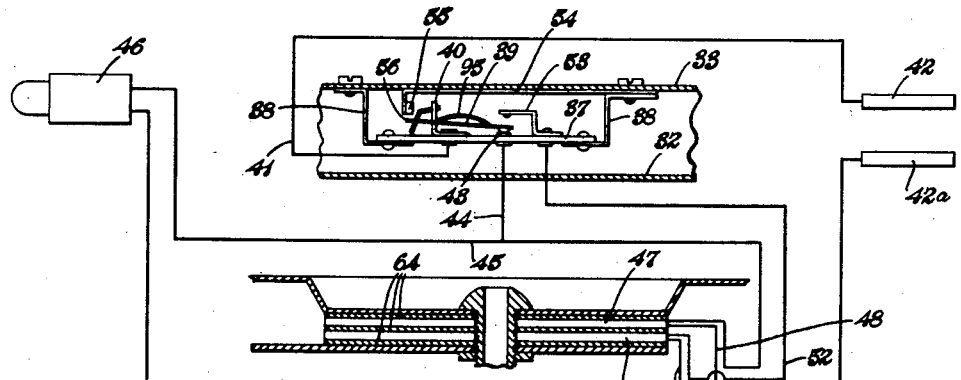
Figure 11:
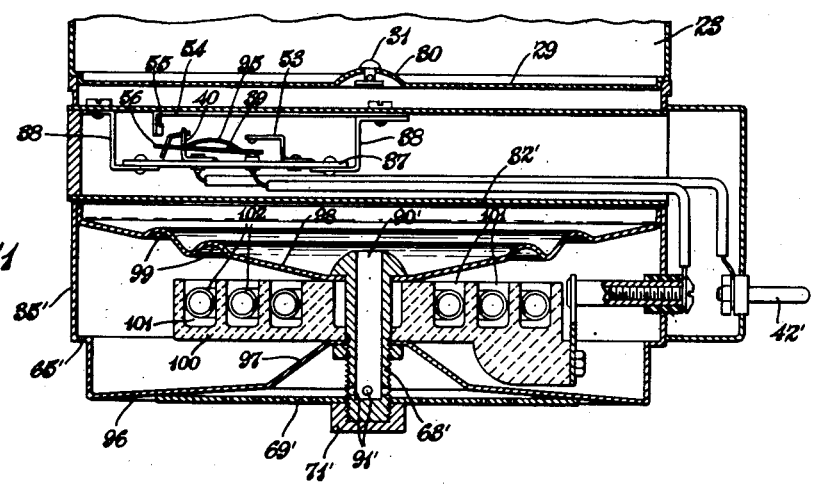
Figure 10:
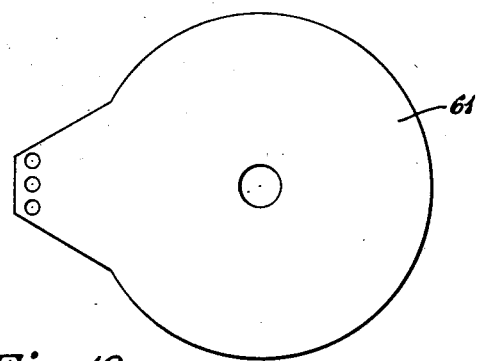
Figure 14:
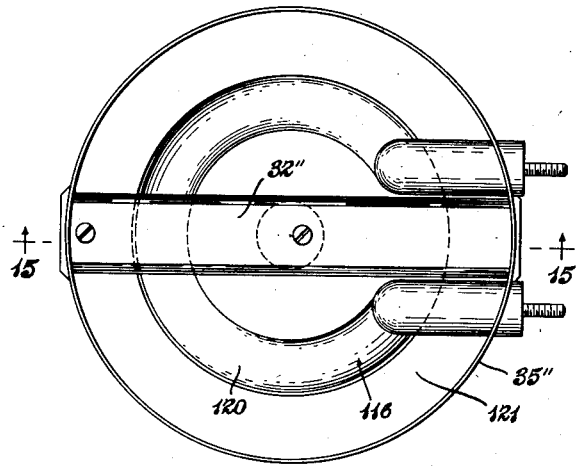
Figure 15:
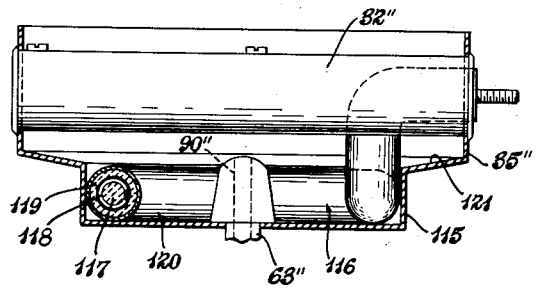
Figure 16:
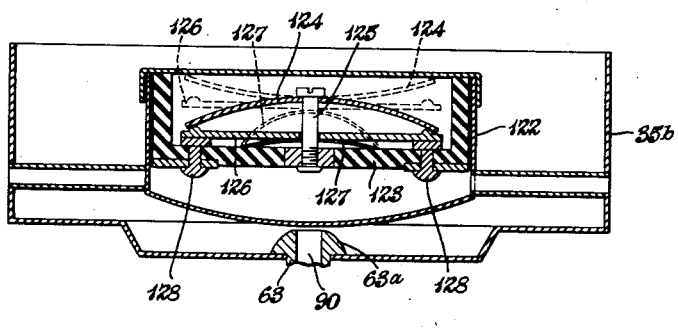

The above objects together with others which will be apparent from the drawings and following description, or which may be later referred to, may be attained by constructing the improved drip coffee maker in the manner hereinafter described in detail and illustrated in the accompanying drawings, in which;

Figure 1 is a vertical, sectional elevation of the water-controlled, full automatic, electric drip coffee maker to which the invention pertains;

Fig. 2 a side elevation, on a much smaller scale, of the improved drip coffee maker with the parts in position for brewing coffee;

Fig. 3 a small scale, side elevation, showing the manner in which the lower container, or coffee beverage pot, may be placed upon the heating compartment to maintain the brewed coffee at desired temperature;

Fig. 4 a fragmentary, rear elevation of portions of the upper and lower containers with the heating compartment located therebetween;

Fig. 5 a front elevation of the heating compartment located in auxiliary base, showing the lower portion of the lower or coffee beverage container mounted upon the heating compartment;

Fig. 6 a transverse, sectional view, on the line 6—6, Fig. 1, showing the heating compartment in plan;

Fig. 7 a fragmentary, transverse, sectional view, taken on the line 7—7 of Fig. 1;

Fig. 8 an enlarged, fragmentary, sectional view of the lower portion of the upper container, showing the bleeder port therein;

Fig. 9 a wiring diagram for the electric heating unit, switch and signal light;

Fig. 10 a plan view of the metal plate which carries the disc wound, mica heating unit and binds the heating unit tightly to the metal shell, as used in Fig. 1;

Fig. 11 a vertical, sectional view through the heating compartment, with a modified heating unit in the form of an open helical type wire unit mounted in a porcelain base;

Fig. 12 a fragmentary top plan view of a modified form of metal shell adapted to house a cooling means for affecting the bi-metal when located on the exterior of the heating chamber;

Fig. 13 a section taken as on the line 13—13, Fig. 12;

Fig. 14 a top plan view of a modified heating compartment showing a Calroid unit used as a means for bringing water to the proper temperature for brewing coffee or tea;

Fig. 15 a section taken as on the line 15—15, Fig. 14; and,

Fig. 16 a transverse section through a modified heating compartment showing a conventional disc-type snap switch.

Referring now more particularly to the construction illustrated in Figs. 1 to 10, the improved drip coffee maker comprises generally four main parts, namely, the lower container or beverage pot 20, the perforate coffee basket 21, which is located in the upper portion of the container 20, the heating compartment 22 and the upper container 23.

This upper container may be provided with a conventional handle 24 for manipulating the same and with a cover 25 having a knob 26 thereon. The lower end of the upper container 23 is preferably shouldered, as at 27, to fit within the upper, open end of the cylindrical wall 28 of the heating compartment.

The bottom wall 29, of the upper container 23, is provided at its center with the convex projection 30 within which is located the bleeder port 31. Located diametrically through the heating compartment 22 is the tubular metal housing 32 within which the switch and bi-metal element are located so as to protect the switch from the direct heat of the heating unit as will be later described.

The tubular housing 32 may be of the cross sectional shape best shown in Fig. 7, the top portion 33 thereof being flat. The ends of this tubular housing 32 are located through suitably shaped apertures 34 in the cylindrical side walls 35 of the heating compartment 23 and are swedged or curled outward and backward as at 36 to permanently attach the tubular housing in position therein.

The switch is located within the tubular housing 32, being mounted upon the insulation base 37, which is suspended from the flat top wall 33 of the tube as by the brackets 38. The switch is shown in detail in Figs. 1 and 9 and comprises the spring loaded switch plate 39 pivoted upon the terminal post 40 which is mounted upon the insulation base 37 and connected by wire 41 with the terminal point 42.

In normal position, the switch plate is in contact with the contact point 43, which is connected by branch wire 44 to the wire 45 leading from the signal lamp 46 to the high heat unit 47, as shown in the wiring diagram in Fig. 9.

At this point attention is called to the fact that while both high and low heat units are shown in the wiring diagram in Fig. 9, the disclosure in Fig. 1 has only a single heating unit which may be a high heat unit. The invention may be carried out in either way.

Referring to Fig. 9, it will be seen that a branch wire 48 connects the high heat unit 47 to the wire 49, which leads from the other terminal point 42a to the signal lamp 46. Where only a single heating unit is used, as in Fig. 1, this is all of the wiring required.

However, where both high and low heat units are used, as shown in the wiring diagram in Fig. 9, the low heat unit 40 is connected by a branch wire 51 to the wire 49 leading from the terminal point 42a to the signal lamp and is connected by a wire 52 to the limit stop 53 mounted upon the insulation base 37 and located above the free end of the switch plate 39 so as to be contacted thereby when the bi-metal strip 54 is flexed downward so that the insulation end 55 thereof strikes the extension 56 of the switch blade 39, as shown in dotted lines in Fig. 1, drawing the opposite end of the switch blade out of contact with the contact point 43 and into contact with the limit stop 53. When this occurs in the construction of Fig. 1 the circuit to the heating unit 47 is broken.

In the construction shown in Fig. 9, this flexing of the bi-metal strip breaks the circuit to the high heat unit 47 in the same manner as above described by the contact of the switch plate 39 with the limit stop 53 closing the circuit to the low heat unit 50 through the wire 52.

The cylindrical shell 35, which houses the switch, is shouldered at its lower end, as at 57, to fit into the upper open end of the cylindrical wall 58 of the heating compartment shell. The bottom wall of the shell 35 is preferably slightly tapered, as at 59, from the outer edge to the flat bottom portion 60.

As shown in Fig. 1, the heating unit 47 is attached to the underside of this flat wall 60, as by the binding plate 61 and binding nut 62 mounted upon the hollow binding stud 63 which is provided at its upper end with the head 63a, engaging the top surface of the bottom wall 60 of the shell 35.

Mica discs 64 are preferably located in each side of the heating unit 47 as shown in Fig. 1 and as shown in Fig. 9 such mica discs are located on each side of each of the high and low heat units 47 and 50.

The shell 58, which encloses the heating unit, is shouldered at 65 to fit upon the bead 66 at the upper edge of the perforate coffee basket 21, which bead in turn rests upon the upper open edge of the lower container 20. This shell 58 has a flat bottom wall 67 having a central opening which receives the binding stud 63, and a binding nut 68 is mounted upon the stud for retaining the shell 58 assembled with the shell 35 as a single unit.

A perforate spreader plate 69 has a central opening receiving the binding stud 63 and is provided with the peripheral, preferably conical wall 70 held in contact with the flat bottom wall 67 of the shell 58 by means of the binding nut 71.

A housing 72, for the terminal points 42 and 42a, is attached to one side of the shell 35 as by the screws 73. A housing 74, for the signal light 46, provided with a lens 75, preferably red, is attached to a diametrically opposite point upon the shell 35 as by the screws 76.

For the purpose of detachably connecting the upper container 23 to the shell 35 of the switch compartment, as best shown in Figs. 2 and 4, spring clips 77 may be attached at their upper ends to the lower portion of the upper container 23, as by rivets 78, and the lower, curved ends 79 of these spring clips are adapted to snap into the sockets 80 formed in the shell 35.

The lower container, or coffee beverage pot, 20 may be provided with a conventional handle 81 for manipulating the same and with the diametrically opposite spout 82 of any conventional design. The lower end of the container 20 is shouldered as at 83, and reduced as at 84, so that it may fit into the upper, open end of the shell 35, in the manner shown in Figs. 3 and 5, for maintaining the coffee beverage at desired temperature.

In Figs. 3 and 5 is shown an auxiliary draining base, indicated generally at 85, upon which the heating compartment may be placed after the coffee beverage has been made. The heating compartment and coffee basket are removed from the upper portion of the lower container 20, the heating compartment being placed in the auxiliary base as shown in these two figures, the shoulder 65 thereof resting upon the upper, open end of the cylindrical portion 86 of the auxiliary base and the reduced lower end 87 thereof extending into said cylindrical portion of the base as shown in Fig. 5.

The lower container 20, with the freshly brewed coffee beverage therein is then placed upon the heating unit, as shown in Figs. 3 and 5, the reduced lower end 84 thereof extending into the upper open end of the shell 35 and the shoulder 83 of the lower container resting upon the upper edge of this shell.

The cover 25 may then be removed from the upper container 23 and placed upon the lower container 20, as shown in Fig. 3. The base 85 has the tapered bowl portion 88, for catching drainage from the heating compartment, and is provided with a disc-shape stand or foot 89 for supporting the same upon a table or other horizontal surface.

In order to make drip coffee in the electric drip coffee maker thus described, the coffee basket 21 is placed in position in the top of the lower container 20 and the desired amount of ground coffee is placed therein.

The combined heating compartment and switch compartment unit, indicated generally at 22, is then placed upon the top of the coffee basket and the upper container 23 is then placed upon the top of the heating compartment and switch compartment unit and the desired amount of cold water is placed therein, and the lid 25 is placed upon the top of the upper containers.

A conventional plug chord set is connected to the terminal points 42 and 42a, connecting them to a power circuit. The switch being normally closed permits current to flow immediately to the electric heating unit 47, and the signal light 46, which immediately shows red to indicate that the heating unit is operating.

The desired amount of water is then poured into the upper container 23, to the level indicated by the dotted line C—C, and the cold water starts to immediately flow through the bleeder port 31 and onto the flat, top portion 33 of the tubular housing 32, and around the exterior of the tube, as indicated by the arrows in Fig. 7, and then drops into the heating cavity of the metal shell 59.

The cold water, spreading along the flat top portion of the tubular housing 32, keeps the bi-metal element 54 cold and non-operative, and the cold water flowing around the sides of the tube does not permit the steam rising from the pool of water in the shell 59 to have direct action on any portion of the tube 32 while the water is being heated in the heating cavity of said shell.

The raised head 63a, upon the binding stud 63, makes it compulsory for the water being heated in the shell 59 to rise to the dotted line A—A, in Fig. 1, thus retarding the flow of hot water through the overflow opening 90 in the stud 63, and trapping the cold water until it is brought to proper temperature for making coffee.

The heated water, rising to the level A—A, flows out through the overflow opening 90 in the stud 63 and passes out through the ports 91 onto the top of the perforate spreader plate 69 and is evenly distributed over the ground coffee in the perforate coffee basket 21, through the apertures 92 in the spreader plate. Relief from back pressure and excessive water flow to the coffee basket is provided by the conventional overflow apertures 93 in the shouldered portion 94 at the upper end of the coffee basket.

As the head pressure lowers in the upper container 23, the flow of water through the bleeder port 31 becomes slower, raising the temperature of the water being heated in the shell 59 by the electric heating unit, and as the last drop of water is emptied from the container 23 the heat or steam generated by the heating unit heats the metal tube housing 32, at which time the bi-metal element 54 becomes active and flexes downward as indicated in dotted lines in Fig. 1.

The insulation 55 on the bi-metal element exerts a slight pressure upon the extension 56 of the switch blade 39, at which time the snap spring 95 becomes active, throwing the switch blade 39 to the dotted line position in Fig. 1, so that it snaps up against the limit stop 53, breaking the circuit to the heating unit 47 and the signal light 46.

For only a single electric heating unit, as shown in Fig. 1, the electric heating is thus cut off, but in cases where a low heat unit is also used, as shown in Fig. 9, the circuit is then closed through the switch blade 39, limit stop 53 and wire 52 to the low heat unit 50.

The upper container 23 may then be removed, and the combined heating and switch compartment unit 22 may be removed and placed upon the auxiliary base 85, as shown in Figs. 3 and 5. The bowl portion 88 of this base catches any condensation, drippings or coffee grounds that may adhere to the heating compartment.

The coffee basket 21 is removed from the top of the lower container 20, which contains the hot coffee beverage, and this lower container is placed upon the top of the combined heating and switch compartment 22, as shown in Figs. 3 and 5, and the cover 25 may be placed thereon.

If the water trapped at the level A—A is left in the shell 59, it will cause the bi-metal element to operate off and on for a considerable period of time in the manner of a steam table.

The action of snapping off and on will be of short periods, at such time when all of the water has been evaporated from the shell 59, the tube will operate from the heat, but the period of the switch cutting the current off and on will be of longer periods and will hold the heat longer due to there being no moisture in the heating compartment. This operation will continue indefinitely. There can be no burning out of the unit because of the sensitive responsive action of the mechanical construction.

In Fig. 11 is shown a slightly modified construction of heating unit and switch compartment, comprising a cylindrical shell 35′, shouldered near its lower end, as at 65′, and provided with the slightly upwardly, inwardly inclined bottom wall 96, terminating at the center in the upwardly disposed, frusto-conical portion 97.

A tube 32′, similar to the tubular housing above described, is located diametrically through the shell 35' and houses a switch identical with the switch shown and described in Fig. 1, and the same reference numerals are applied to all parts thereof as in Fig. 1.

The wiring may be identical with that shown in Fig. 9. The heating chamber for the water comprises a coned disc 98 with annular corrugations 99 therein to retard the flow of water by backing up on the outside of each corrugation and then overflowing to the next corrugation and finally overflowing through the port 90' in the binding stud 63' and through the vents 91' onto the perforate spreader plate 69', this spreader plate being connected by means of the binding nut 71'.

The heating unit comprises a conventional unit such as is used in small electric stoves and electric vacuum coffee makers, and comprises a refractory plug 100, having a spiral groove 101 therein within which is spirally wound a coiled wire electric heating element 102 electrically connected to the terminal points 42'.

In Figs. 12 and 13 is shown another modification, in which the water heating shell 59' is provided with a central cupped portion 103. A small receiving cup 104 is supported spaced above the center of this shell by means of a radially disposed rod 105 and a tube 106.

Water flows from the upper water container, as in Fig. 1, in the manner above described, into the receiving cup 104, out through the port 107 thereof and through the tube 106 and out through the port 108. The cavity 109, communicating with the tube 106, allows a back wash of cold water close to the binding point of the bi-metal strip 110, so as to maintain the bi-metal cold until all of the water has been drained from the upper container.

At this time the tube 106 becomes heated, conveying the heat to the bi-metal strip 110, causing the same to flex and separate the flexible switch members 111. Terminals 112 are shown for connecting electric wires to the switch members 111.

This bi-metal element and switch are located within a housing 113, mounted upon one side of the shell 59'. It should be understood that a switch of the same type as shown in Fig. 1 may be used within the housing 113 if desired.

The operation of the drip coffee maker with this modification is otherwise the same as above illustrated and described. The port indicated at 114 is merely for the purpose of cleaning the outlet port 108 so as to keep the same open.

In Figs. 14 and 15 is shown another slight modification, in which an electric heating unit of the type known to the trade as a Calrod unit, is provided, this unit being either a high heat unit or a high and low heat unit enclosed in an insulated metal tube.

The shell 35'' is similar to the shell 35 shown in Fig. 1, excepting that it has the central cupped portion 115 at its center. The tubular housing 32'' may be as shown in Fig. 1 and may house a switch of the type shown in Fig. 1.

The Calrod unit, as indicated generally at 116, may comprise a core 117, of refractory material, surrounded by the coiled wire 118, which in turn is surrounded by a refractory tube 119 enclosing the wire within the tubular metal shell 120.

In the operation of this modification the cold water flows from the upper container onto the tubular housing 32'' and overflows onto the inclined surface 121 of the shell, and down into the cavity 115 thereof, and is heated by the electric heat unit 116 and overflows through the port 90'', in the binding stud 63''.

In Fig. 16 is shown a modified form of switch which is a conventional snap action switch known to the trade as a Stephens type switch. This switch is located within a closed housing 122, located within the shell 35b, and is mounted upon an insulation tube 123.

This is a conventional type of bi-metal snap switch, and comprises a bi-metal disc 124, centrally connected to the post 125 upon which is slidably mounted the metal contact disc 126, normally urged upward by the spring 127. With this bi-metal disc 124 normally flexed, as shown in full lines, the contact disc 126 is held in contact with the terminals 128, to which the electric wires are connected.

With the bi-metal disc 124 flexed upward, to the dotted line position, due to rising temperature, the contact disc 126 is raised out of contact with the contact points 128 by the spring 127, breaking the circuit.

I claim:

1. An electric drip coffee maker comprising a lower coffee beverage container, a perforate coffee basket mounted at the top of said lower container, a perforate spreader plate located in the upper portion of the coffee basket, a heating compartment at the top of the coffee basket and spaced above the spreader plate, a heating unit in the heating compartment, a water heating shell located directly above the heating compartment, an entirely enclosed housing within the water heating shell, a circuit to the heating unit, a normally closed bi-metal switch in the circuit and located in said housing, an overflow tube located through the bottom of the water heating shell and extending down through the heating compartment to the spreader plate, an upper cold water container located above the water heating shell, and a bleeder port in the bottom of the upper container for continuously discharging cold water from the upper container into the water heating shell and around the housing in which the bi-metal switch is located, whereby the bi-metal will be cooled by the cold water and the switch will remain closed while the water is being discharged from the upper container.

2. An electric drip coffee maker comprising a lower coffee beverage container, a perforate coffee basket mounted at the top of said lower container, a perforate spreader plate located in the upper portion of the coffee basket, a heating compartment at the top of the coffee basket and spaced above the spreader plate, a heating unit in the heating compartment, a water heating shell located directly above the heating compartment, an entirely enclosed housing within the water heating shell, a circuit to the heating unit, a normally closed bi-metal switch in the circuit and located in said housing, an overflow tube located through the bottom of the water heating shell and extending upward above the bottom thereof and down through the heating compartment to the spreader plate, an upper cold water container located above the water heating shell, and a bleeder port in the bottom of the upper container for continuously discharging cold water from the upper container into the water heating shell and around the housing in which the bi-metal switch is located, whereby the bi-metal will be cooled by the cold water and the switch will remain closed while the water is being discharged from the upper container.

3. An electric drip coffee maker comprising a lower coffee beverage container, a perforate coffee basket mounted at the top of said lower container, a perforate spreader plate located in the upper portion of the coffee basket, a heating compartment at the top of the coffee basket and spaced above the spreader plate, a heating unit in the heating compartment, a water heating shell located directly above the heating compartment, an entirely enclosed housing within the water heating shell, a circuit to the heating unit, a normally closed bi-metal switch in the circuit and located in said housing, an overflow tube located through the bottom of the water heating shell and extending down through the heating compartment to the spreader plate, there being reduced ports in the sides of said overflow tube above the level of the spreader plate, an upper cold water container located above the water heating shell, and a bleeder port in the bottom of the upper container for continuously discharging cold water from the upper container into the water heating shell and around the housing in which the bi-metal switch is located whereby the bi-metal will be cooled by the cold water and the switch will remain closed while the water is being discharged from the upper container.

4. An electric drip coffee maker comprising a lower coffee beverage container, a perforate coffee basket mounted at the top of said lower container, a perforate spreader plate located in the upper portion of the coffee basket, a heating compartment at the top of the coffee basket and spaced above the spreader plate, a heating unit in the heating compartment, a water heating shell located directly above the heating compartment, an entirely enclosed housing within the water heating shell, a circuit to the heating unit, a normally closed bi-metal switch in the circuit and located in said housing, an overflow tube located through the bottom of the water heating shell and extending upward above the bottom thereof and down through the heating compartment to the spreader plate, there being reduced ports in the sides of said overflow tube above the level of the spreader plate, an upper cold water container located above the water heating shell, and a bleeder port in the bottom of the upper container for continuously discharging cold water from the upper container into the water heating shell and around the housing in which the bi-metal switch is located, whereby the bi-metal will be cooled by the cold water and the switch will remain closed while the water is being discharged from the upper container.

5. An electric drip coffee maker comprising a lower coffee beverage container, a perforate coffee basket mounted at the top of said lower container, a perforate spreader plate located in the upper portion of the coffee basket, a heating compartment at the top of the coffee basket and spaced above the spreader plate, a heating unit in the heating compartment, a water heating shell located directly above the heating compartment, an entirely enclosed horizontal tubular housing within the water heating shell, a circuit to the heating unit, a normally closed bi-metal switch in the circuit and located in said housing, an overflow tube located through the bottom of the water heating shell and extending down through the heating compartment to the spreader plate, an upper cold water container located above the water heating shell, and a bleeder port in the bottom of the upper container for continuously discharging cold water from the upper container into the water heating shell and around the housing in which the bi-metal switch is located, whereby the bi-metal will be cooled by the cold water and the switch will remain closed while the water is being discharged from the upper container.

ALBERT C. WILCOX.

References Cited in the file of this patent

UNITED STATES PATENTS

| Number | Name | Date |
| --- | --- | --- |
| 1,246,622 | Lightfoot | Nov. 13, 1917 |
| 1,678,885 | Thomas | July 31, 1928 |
| 1,806,004 | Tavender | May 19, 1931 |
| 1,838,206 | Alaj | Dec. 29, 1931 |
| 2,011,397 | Dempster | Aug. 13, 1935 |
| 2,192,095 | Myers | Feb. 27, 1940 |
| 2,230,304 | Locke | Feb. 4, 1941 |
| 2,272,471 | Miller | Feb. 10, 1942 |
| 2,282,089 | Propernick | May 5, 1942 |
| 2,290,660 | Wilcox | July 21, 1942 |

FOREIGN PATENTS

| Number | Country | Date |
| --- | --- | --- |
| 592,084 | Germany | Feb. 1, 1934 |